United States Patent
Fukui

(10) Patent No.: US 9,519,406 B2
(45) Date of Patent: Dec. 13, 2016

(54) ELECTRONIC DEVICE, METHOD AND STORAGE MEDIUM

(71) Applicant: KABUSHIKI KAISHA TOSHIBA, Minato-ku, Tokyo (JP)

(72) Inventor: Kotaro Fukui, Hamura Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 14/614,246

(22) Filed: Feb. 4, 2015

(65) Prior Publication Data
US 2015/0145800 A1  May 28, 2015

Related U.S. Application Data

(63) Continuation of application No. PCT/JP2013/059106, filed on Mar. 27, 2013.

(51) Int. Cl.
*G06F 3/0483* (2013.01)
*G06F 3/01* (2006.01)
(Continued)

(52) U.S. Cl.
CPC ........... *G06F 3/0483* (2013.01); *G06F 1/1626* (2013.01); *G06F 1/1694* (2013.01); *G06F 3/017* (2013.01); *G06F 3/0346* (2013.01); *G06F 3/0412* (2013.01); *G06F 3/04883* (2013.01); *G09G 5/38* (2013.01); *G09G 2354/00* (2013.01); *G09G 2380/14* (2013.01)

(58) Field of Classification Search
CPC .... G06F 3/0483; G06F 3/0346; G06F 1/1626; G06F 1/1694; G06F 3/017; G06F 3/0412; G06F 3/04883; G09G 5/38; G09G 2380/14; G09G 2354/00
See application file for complete search history.

(56) References Cited

U.S. PATENT DOCUMENTS 6,201,554 B1 * 3/2001 Lands ................... G06F 1/1626
345/156
2011/0074671 A1 3/2011 Shimosato
(Continued)

FOREIGN PATENT DOCUMENTS

| JP | 10-161619 | 6/1998 |
|---|---|---|
| JP | 2002-140159 | 5/2002 |

(Continued)

OTHER PUBLICATIONS

English translation of Written Opinion (PCT/ISA/237) issued by Japan Patent Office on Sep. 29, 2015 in the corresponding PCT patent application No. PCT/JP2013/059106—7 pages.
(Continued)

*Primary Examiner* — Andrew Sasinowski
(74) *Attorney, Agent, or Firm* — Knobbe, Martens Olson & Bear LLP

(57) ABSTRACT

According to one embodiment, an electronic device includes a display configured to display a content including pages, a touch panel on the display, and circuitry. The circuitry is configured to detect a tilt of the device, switch a displayed page from a first page to a second page when the device is tilted in a first direction, and when a contact on a partial area of the touch panel corresponding to the first direction is detected, stop switching of a displayed page based on a tilt of the device in the first direction.

10 Claims, 11 Drawing Sheets

(51) Int. Cl.
  *G09G 5/38*    (2006.01)
  *G06F 3/041*   (2006.01)
  *G06F 3/0488*  (2013.01)
  *G06F 1/16*    (2006.01)
  *G06F 3/0346*  (2013.01)

(56) References Cited

U.S. PATENT DOCUMENTS

| | | | |
|---|---|---|---|
| 2012/0084702 A1* | 4/2012 | Lee | G06F 3/04883 715/776 |
| 2012/0188154 A1* | 7/2012 | Lee | G06F 1/1694 345/156 |
| 2012/0200487 A1* | 8/2012 | Dvorak | G06F 3/0362 345/156 |
| 2013/0021281 A1* | 1/2013 | Tse | G06F 3/0425 345/173 |

FOREIGN PATENT DOCUMENTS

| | | |
|---|---|---|
| JP | 2002-341991 A | 11/2002 |
| JP | 2003-345492 | 12/2003 |
| JP | 2010-009575 A | 1/2010 |
| JP | 2011-175120 A | 9/2011 |
| JP | 2012-043383 | 3/2012 |
| JP | 2012-048583 | 3/2012 |
| JP | 2012-079301 | 4/2012 |
| JP | 2012-212194 A | 11/2012 |
| KR | 10-2013-0013292 A | 2/2013 |

OTHER PUBLICATIONS

Japanese Office Action for corresponding Japanese Application No. 2015-507786, dated Aug. 25, 2015, 9 pages.
International Search Report and Written Opinion for application No. PCT/JP2013/059106, mailed on Jun. 18, 2013.

* cited by examiner

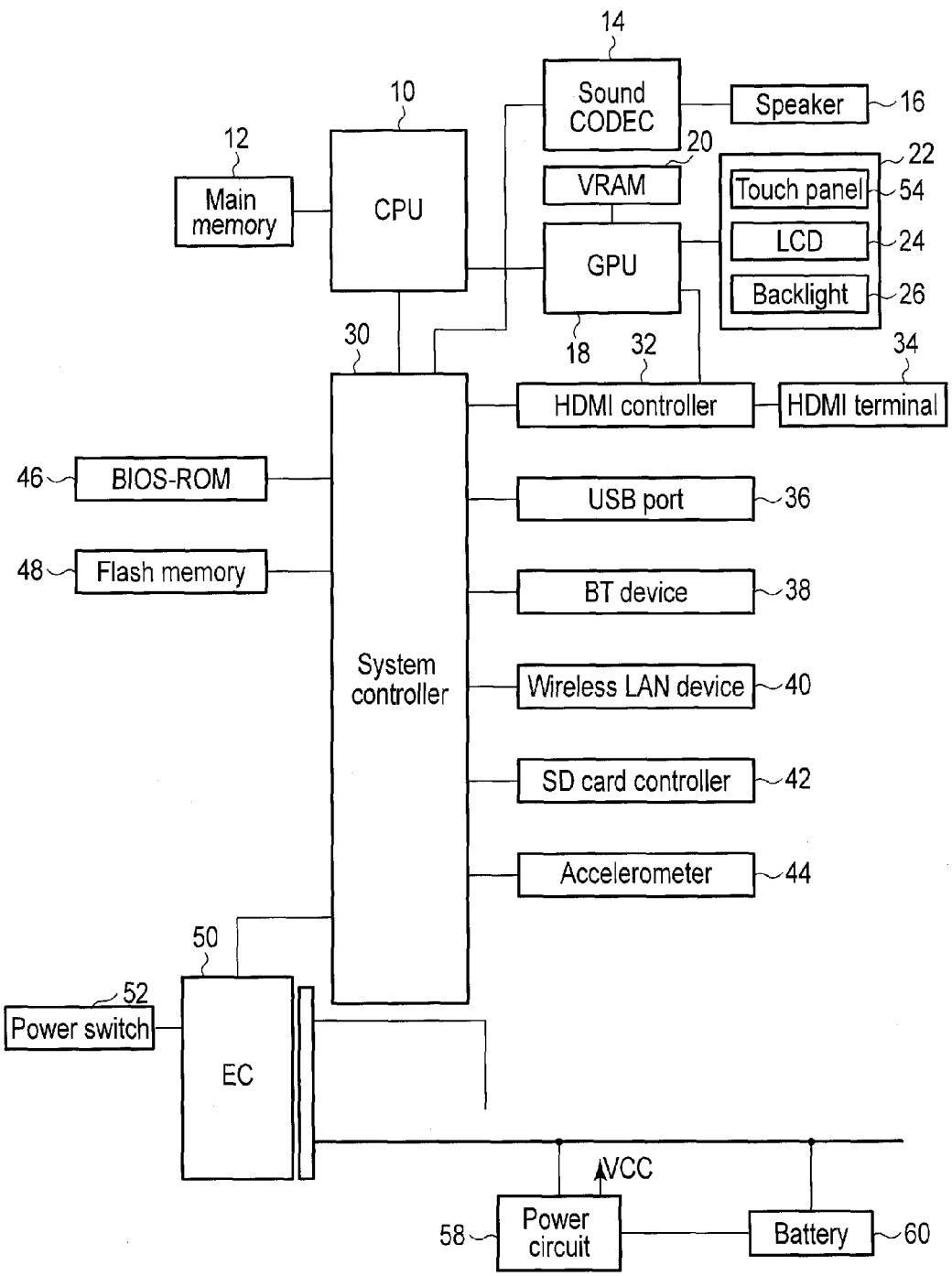
F I G. 2

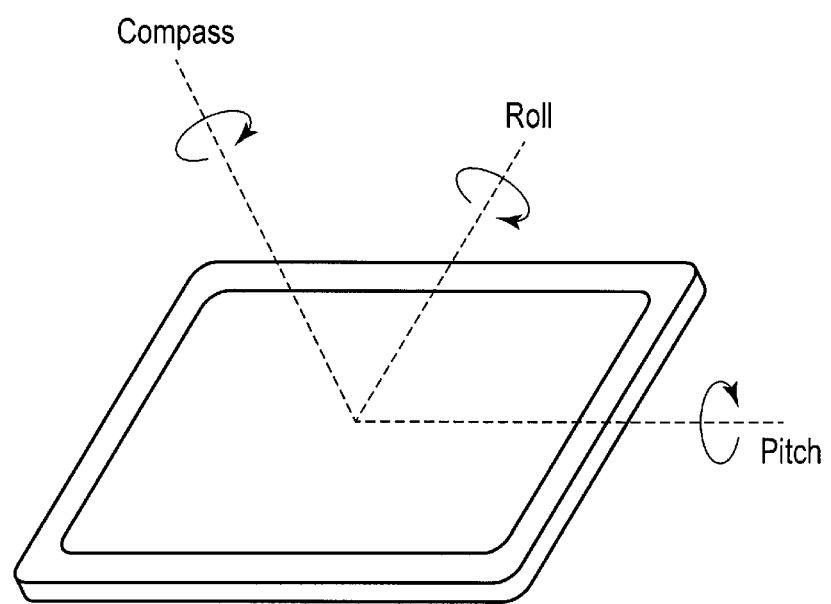
F I G. 3

ELECTRONIC DEVICE, METHOD AND STORAGE MEDIUM

CROSS REFERENCE TO RELATED APPLICATIONS

This application is a Continuation Application of PCT Application No. PCT/JP2013/059106, filed Mar. 27, 2013, the entire contents of which are incorporated herein by reference.

FIELD

Embodiments described herein relate generally to an electronic device for displaying the documents of a plurality of pages.

BACKGROUND

In recent years, electronic devices having an electronic book function have been in practical use. Such electronic devices include, for example, an electronic book reader. Also, there have been developed dedicated electronic book readers in the form of a mobile device. Further, the electronic book reader applications that are used by being installed on a mobile device such as a tablet personal computer (PC) and a smartphone have been sold.

When reading an electronic book with such an electronic book reader on a vehicle such as a train or a bus during commuting, it is preferable that the user can operate the reader easily since they have baggage or are holding on to a strap. Page turning is performed most frequently among the operations of an electronic book reader. Conventionally, page turning has been performed by operating buttons such as previous-page or next-page buttons.

With conventional devices, since the displayed page is turned page-by-page with a button operation, it is difficult to efficiently find a desired page by flipping through pages as in a printed book.

Such a problem similarly occurs not only with an electronic book reader but also with page-turning function is incorporated into a PC that displays a document, a table, a picture and web contents (hereinafter generally referred to as a document).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block circuit diagram illustrating a system configuration of the electronic book reader of the embodiment.

FIG. 3 is an exemplary view illustrating directions of detection angles of a sensor of the embodiment.

DETAILED DESCRIPTION

Various embodiments will be described hereinafter with reference to the accompanying drawings.

In general, according to one embodiment, an electronic device includes a display configured to display a content including pages, a touch panel on the display, and circuitry. The circuitry is configured to detect a tilt of the device, switch a displayed page from a first page to a second page when the device is tilted in a first direction, and when a contact on a partial area of the touch panel corresponding to the first direction is detected, stop switching of a displayed page based on a tilt of the device in the first direction.

Figure 1A:
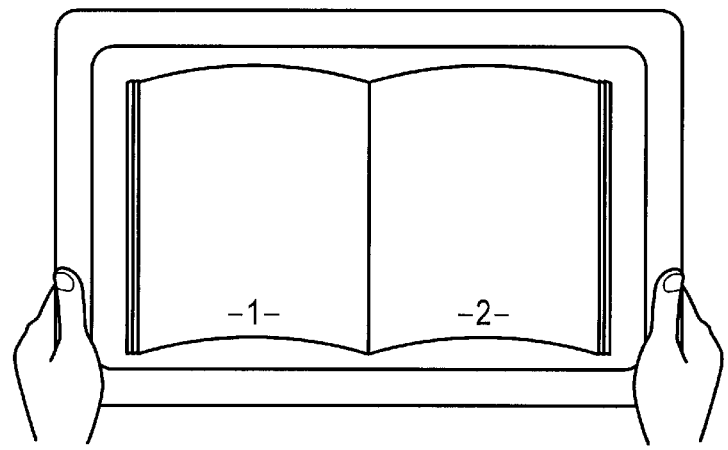
FIGS. 1A and 1B are exemplary perspective views illustrating an exterior of an electronic book reader of an embodiment.
Figure 1B:
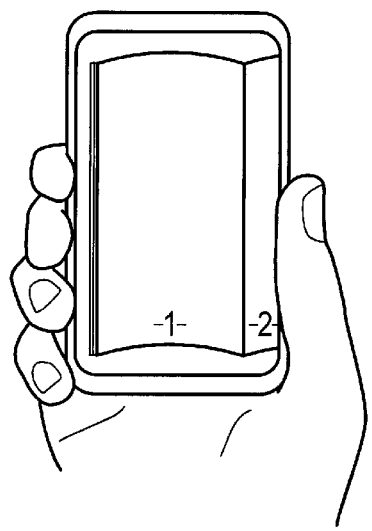

FIG. 1 is an exemplary perspective view illustrating the exterior of the electronic device (electronic book reader) of the embodiment. While the following shows as examples electronic devices on which an electronic book application is installed to a mobile device such as a tablet PC (FIG. 1A) or a smartphone (FIG. 1B) and used as an electronic book reader, it may be a dedicated electronic book reader in the form of a mobile device.

The tablet PC shown in FIG. 1A is usually held in both hands but may also be held in one hand only. The tablet PC is held so that the thumbs do not touch the screen and are positioned on the frame portion of the main body outside the screen. The screen of the tablet PC is relatively large and can display a left and right two-page spread in landscape orientation. In this case, turning of the displayed page enables simulated display of an operation of turning the page of a printed book, and the displayed page is turned two pages at a time. A displayed page may also be turned one page at a time.

The smartphone shown in FIG. 1B usually fits in the palm and is held in one hand because it is small. In this case, the smartphone is held so that the fingers do not touch the screen and are positioned on the frame portion of the main body outside the screen. The screen of the smartphone is relatively small and usually displays one page and a fraction (severalth) of the next page in portrait orientation. In this case, a page can be slid left and right and is turned one page at a time. The page layout of display of FIG. 1B may be only a one-page display without displaying the next page. In this case, a displayed page is turned to the next or previous page as in a normal browser display screen.

Both the tablet PC and the smartphone are portable devices (electronic devices) shaped in a flat plate having a touch panel display/input unit and a network connection function.

FIG. 2 is an exemplary system configuration diagram of the electronic device (both the tablet PC and the smartphone have the same structure) which constitutes the embodiment.

This system includes a CPU 10, a main memory 12, a sound codec 14, a graphics processing unit (GPU) 18, an HDMI controller 32, a USB port 36, a Bluetooth (BT) device 38, a wireless LAN device 40, an SD card controller 42, an accelerometer 44, a BIOS-ROM 46, a flash memory 48, an embedded controller/keyboard controller (EC/KBC) 50, and a system controller 30 connected thereto.

The CPU 10 is a processor (circuitry) that controls the operation of each unit of an electronic book reader.

In this system, while the flash memory 48 of large volume is used as a large-capacity storage device instead of a hard disk drive, a hard disk drive may also be used.

The CPU 10 executes an operating system (OS) and each type of application programs (including application program of electronic book reader) that are loaded from the flash memory 48 into the main memory 12. The CPU 10 also executes BIOS that is stored in the BIOS-ROM 46. The BIOS is a program for controlling hardware.

The system controller 30 is a bridge device that connects the local bus of the CPU 10 and each component. The system controller 30 is equipped with a memory controller that performs access control for the main memory 12. Also, the system controller 30 has a function to execute communication with the GPU 18 via, for example, a serial bus conforming to the PCI EXPRESS standard. Further, the system controller 30 has a function to execute communication with the sound codec 14.

A speaker (or headphone terminal) 16 is connected to the sound codec 14. The sound codec 14 is a sound source device and outputs audio data subject to reproduce to the speaker 16 or the HDMI controller 32. Some electronic books are accompanied with voice data. Therefore, if the application has a function to read voice aloud, loudspeaking output can be performed for the contents of the electronic book from the speaker (or headphone) 16.

A video RAM (VRAM) 20 and a display unit 22 are connected to the graphics processing unit (GPU) 18. The display unit 22 includes an LCD 24, a backlight 26 and a touch panel 54. With the control of the GPU 18, a book text or a book image is displayed on the LCD 24.

The touch panel 54 is, for example, a capacitive touch panel. The touch panel 54 inputs coordinate data of a touched position.

The GPU 18 is a display controller that controls the display unit 22. A display signal generated by the GPU 18 is supplied to the LCD 24. Also, the GPU 18 can supply a digital video signal to an external display via the HDMI controller 32 and the HDMI terminal 34.

The HDMI terminal 34 is an external display connection terminal. The HDMI terminal 34 can supply an uncompressed digital video signal and an uncompressed digital audio signal to a TV-like external display via one cable.

The HDMI controller 32 is an interface to supply a digital video signal to an external display called HDMI monitor via the HDMI terminal 34.

The wireless LAN device 40 is a wireless communication device that executes wireless communication conforming to, for example, the IEEE 802.11 standard. By using the wireless LAN device 40, it is possible to download electronic book data by connecting to the Internet.

The USB port 36 executes communication with an external device to be connected via a USB connector (not shown). Electronic book data can also be supplied from an external device via the USB port 36.

The BT device 38 is a device that executes near-field wireless communication with an external device. Electronic book data can also be supplied from an external device via the BT device 38.

The SD card controller 42 performs data write and read for a memory card to be inserted to a card slot that is provided in the main body of the electronic device.

The accelerometer 44 is constituted by a hall element that detects geomagnetism, for example, and detects triaxial angles shown in FIG. 3 by combining three elements in three directions of the x-, y- and z-axes.

An angle around the x-axis which is a left and right direction of the screen of the electronic device is referred to as a pitch angle, an angle around the y-axis which is a upper and lower direction of the screen of the electronic device is referred to as a roll angle, and an angle around the z-axis which is orthogonal to the screen is referred to as a compass angle.

The display mode shown in FIG. 1A is configured to turn a page by rotating the electronic device around the roll axis so that a page can be turned by an operation similar to that of a printed book. That is, a page is turned from left to right if the electronic device is tilted so that the roll angle is positive (i.e., the left side of the device is frontward and the right side is the opposite side). The roll angle is positive if the electronic device is rotated clockwise around the roll axis viewed from the origin. In the example of FIG. 1A, the page number is larger on the right side and smaller on the left side. Therefore, if the page is turned over from left to right, the display changes so that the page number decreases to display the previous page.

In contrast, if the device is tilted so that the roll angle is negative (i.e., the right side of the device is frontward and the left side is the opposite side), the page is turned over from right to left and the display changes so that the page number decreases to display the next page. The roll angle is negative if the electronic device is rotated anticlockwise around the roll axis viewed from the origin. In the display mode shown in FIG. 1B, while a page is not turned over but slid, a displayed page can be switched similarly by rotating the electronic device around the roll axis. Such page turning and page sliding including switching from a displayed page to the next or previous page as in a normal browser display screen are referred to as "page turning."

If the page number is smaller on the right side and larger on the left side as in a Japanese book written vertically, the page number increases if the page is turned over from left to right. Therefore, the direction of page turning and the increase/decrease of a displayed page number depend on the type of book.

Figure 4A:
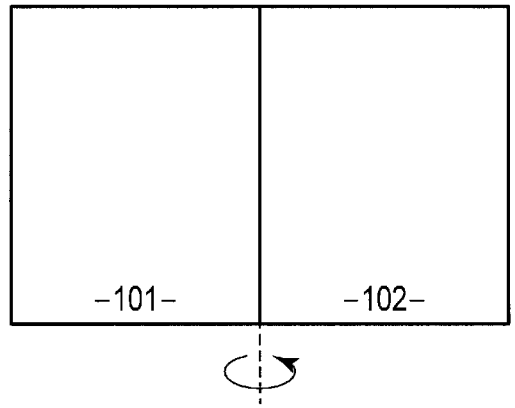
FIGS. 4A, 4B, and 4C are exemplary views illustrating a book display screen of the electronic book reader of the embodiment.

For example, as shown in FIG. 4A, when the two-page spread of pages 101 and 102 is displayed, if the device is tilted so that the roll angle is positive, the page is turned over from left to right to display the previous page. The speed of page turning depends on an absolute value of the roll angle. As the roll angle is larger, the speed of page turning is faster. Therefore, if the user wants to perform page turning at a high speed, the electronic device should be tilted to a large extent. During tilting, page turning is performed continuously and is ended if the device is returned to the horizontal.

Figure 4B:
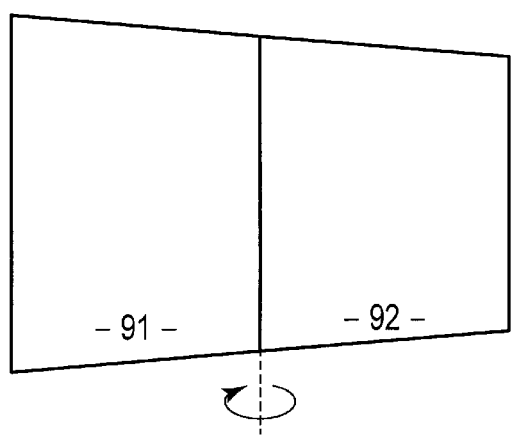
Figure 4C:
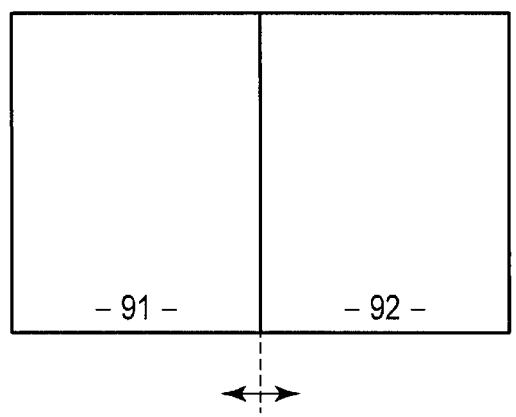

For example, if the device is tilted in the opposite direction (so that the roll angle decreases) to be returned to the horizontal with the two-page spread of pages 91 and 92 displayed as shown in FIG. 4B, the two-page spread of pages 91 and 92 is fixed as a displayed page as shown in FIG. 4C.

Although not shown, pages 103, 104, . . . , each of which is the next page, are sequentially displayed by tilting the device from the state of FIG. 4A so that the roll angle is negative.

Also, the correspondence relationship between the positive/negative of the roll angle and the direction of page turning (left to right or right to left) may be opposite to the above one. Further, a center to be tilted may not only be the roll axis but also be the pitch axis and the compass axis.

The embedded controller/keyboard controller (EC/KBC) 50 is a single-chip microcomputer that integrates an embedded controller for power management and a keyboard controller for controlling the keyboard and the touch panel 54.

A power switch 52, a power circuit 58 and a battery 60 are connected to the EC/KBC 50.

The EC/KBC 50 has a function to power on/off the main body of the electronic device according to the user's operation of the power button.

In the following, an example of page turning of the embodiment will be described. As shown in FIGS. 4A, 4B, and 4C, pages are flipped continuously while the device is tilted in the roll direction and page turning (or flipping) stops if the device is returned to the horizontal. The following describes stopping page turning by an operation other than returning the device to the horizontal.

Figure 5A:
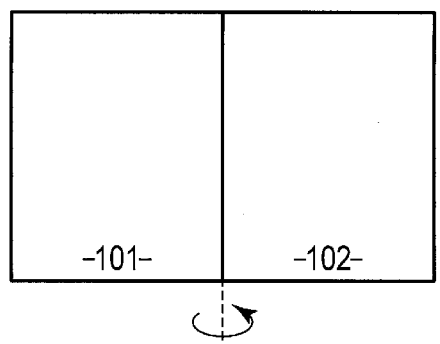
FIGS. 5A, 5B, 5C, and 5D are exemplary views illustrating another book display screen of the electronic book reader of the embodiment.
Figure 5B:
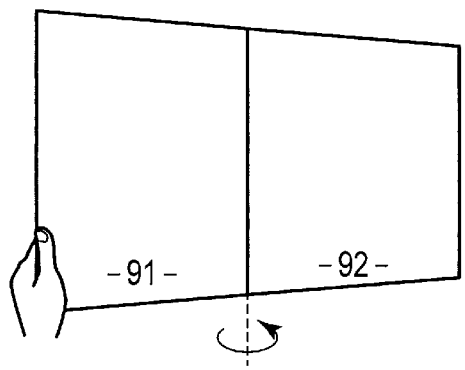

If the device is tilted so that the roll angle is positive with the two-page spread of pages 101 and 102 displayed as shown in FIG. 5A, the displayed page changes to decrease the page number and the two-page spread of pages 91 and 92 is displayed as shown in FIG. 5B. In this state, a certain point of the left half (page 91) of the display screen is touched with a finger.

In a printed book, page turning cannot be performed from left to right if the left page is held with a finger. Therefore, as shown in FIG. 5B, when the two-page spread of pages 91 and 92 is displayed and a certain point of the left half (page 91) is touched with a finger, page turning stops. Even if the device remains tilted, page turning is not performed in a direction of decreasing the page number and the two-page spread of pages 91 and 92 remains displayed.

Figure 5C:
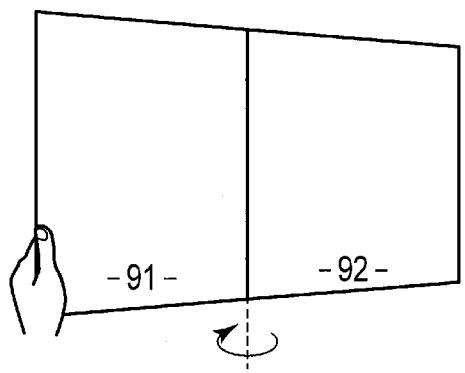
Figure 5D:
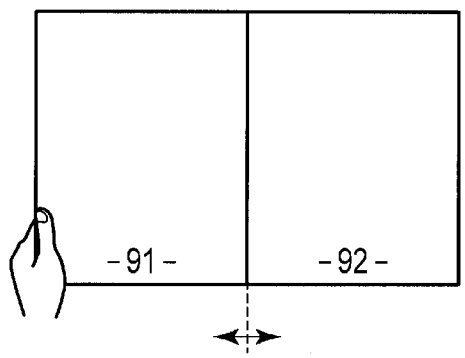

As shown in FIG. 5C, if the device is tilted in the opposite direction (so that the roll angle decreases) to be returned to the horizontal with a certain point of the left half touched with a finger, the two-page spread of pages 91 and 92 is fixed as a displayed page as shown in FIG. 5D.

Figure 6A:
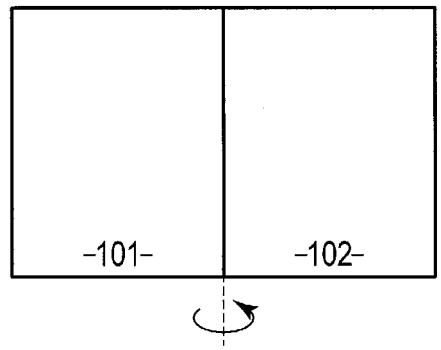
FIGS. 6A, 6B, 6C, and 6D are exemplary views illustrating still another book display screen of the electronic book reader of the embodiment.
Figure 6B:
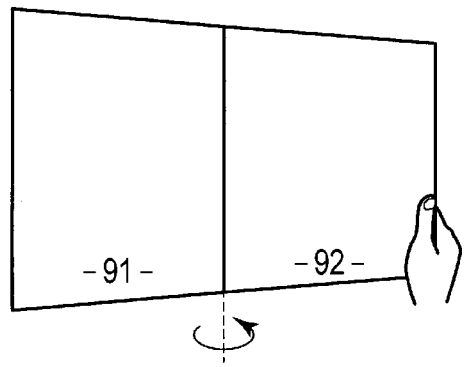

If the device is tilted so that the roll angle is positive with the two-page spread of pages 101 and 102 displayed as shown in FIG. 6A, the displayed page changes to decrease the page number and the two-page spread of pages 91 and 92 is displayed as shown in FIG. 6B. In this state, as opposed to FIG. 5B, a certain point of the right half (page 92) of the display screen is touched with a finger.

Figure 6C:
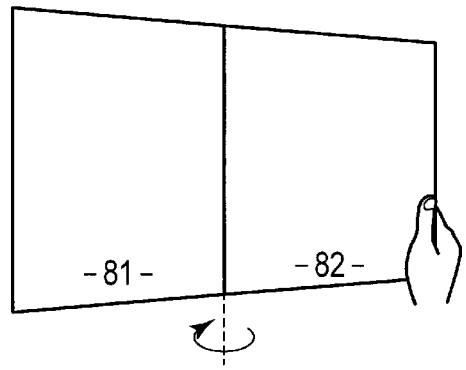
Figure 6D:
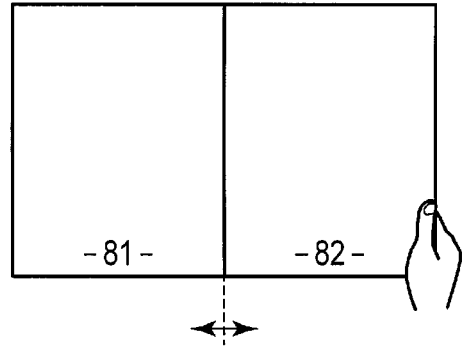

In a printed book, if the right page is held with a finger, page turning can be performed from left to right although not from right to left. In a printed book, pages may be overlapped with a point held with a finger. If page turning is continued to decrease the page number and the two-page spread of pages 81 and 82 is displayed as shown in FIG. 6C. If the device is tilted in the opposite direction (so that the roll angle decreases) to be returned to the horizontal with a certain point of the right half (page 82) of the display screen touched with a finger, the two-page spread of pages 81 and 82 is fixed as a displayed page as shown in FIG. 6D.

Thus, as shown in FIGS. 5A-5D and 6A-6D, it is possible to prohibit page turning in one direction by touching with a finger the half of the screen according to a direction of page turning. Therefore, a desired page can be viewed by prohibiting page turning, without returning the device to the horizontal. This allows the user to deal with a case where the device cannot be returned to the horizontal. This also prevents the device from being excessively returned to the horizontal to perform page turning in the opposite direction, because it is difficult to keep the device horizontal. While page turning cannot be performed if the half of the screen is touched with a finger and the page turning is performed in a direction corresponding to the touched half portion, page turning continues in the opposite direction.

Thus, if the electronic device has a first end (edge) and a second end (edge) which is on the opposite side of the first end (edge), when the first end (edge) is tilted to be positioned upper in a vertical direction than the second end (edge), page turning stops if a area (partial area) closer to the first end (edge) than the second end (edge) is touched. That is, as shown in FIG. 5B, if the electronic device rotates clockwise and is tilted so that the left end (edge) is positioned upper in a vertical direction than the right end (edge), the left end (edge) is the first end (edge) and the right end (edge) is the second end (edge). Therefore, page turning stops if the left half of the screen (a partial area closer to the first end [edge] than the second end [edge]) is touched.

Although not shown, pages 103, 104, . . . , each of which is the next page, are sequentially displayed by tilting the device in the opposite direction in FIGS. 5A and 6A, i.e., by tilting the device so that the roll angle is negative.

While the two-page spread is displayed as a page layout in FIGS. 4A-4C, 5A-5D and 6A-6D for explanation, only one page may be displayed.

Next, the examples of other operations to stop page turning will be described with reference to FIGS. 7A-7D.

Figure 7A:
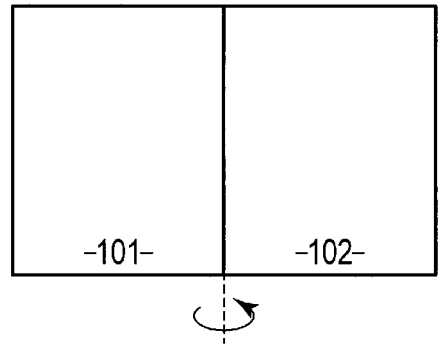
FIGS. 7A, 7B, 7C, and 7D are exemplary views illustrating further another book display screen of the electronic book reader of the embodiment.
Figure 7B:
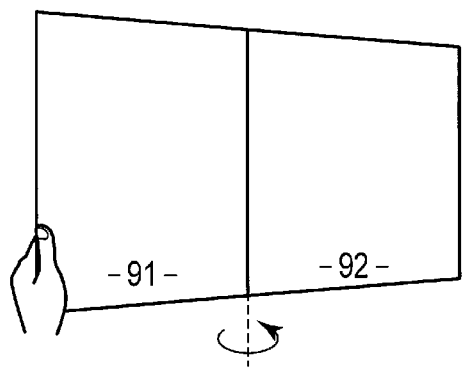

FIGS. 7A and 7B are substantially identical with FIGS. 6A and 6B. If the device is tilted so that the roll angle is positive with the two-page spread of pages 101 and 102 displayed as shown in FIG. 7A, the displayed page changes to decrease the page number and the two-page spread of pages 91 and 92 is displayed as shown in FIG. 7B.

Figure 7C:
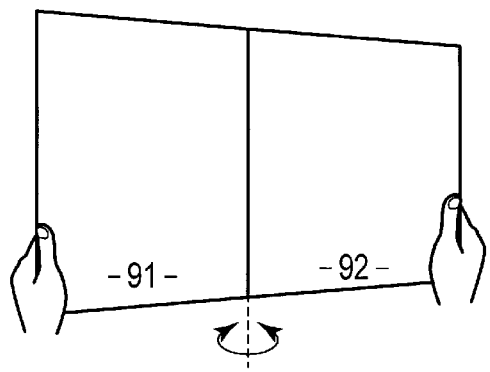

In this state, a certain point of the left half (page 91) of the display screen is touched with a finger. Further, in this state, even if the device remains tilted, page turning is not performed from left to right as shown in FIG. 7C. Furthermore, in this state, a certain point of the right half (page 92) of the display screen is touched with a finger. That is, in FIG. 7C, each of the left and right half of the display screen is touched by the left and right finger.

Figure 7D:
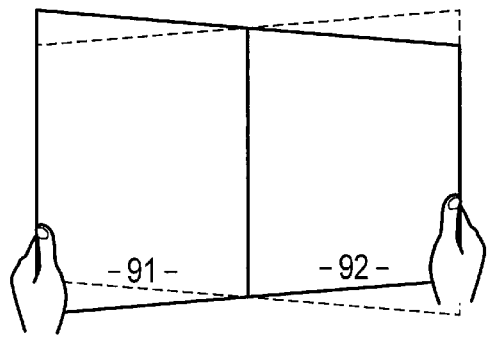

As this prohibits page turning both from left to right and from left to right, the displayed page is fixed in this state. Thereafter, as shown in FIG. 7D, the displayed page remains unchanged even if the device is tilted in any direction. Thus, as shown in FIGS. 7A-7D, it is possible to prohibit page turning from left to right and from right to left also by touching the left and right half of the screen with a finger. Therefore, a desired page can be viewed without returning the device to the horizontal. This allows the user to deal with a case where the device cannot be returned to the horizontal.

This also prevents the device from being returned excessively to the horizontal to perform page turning in the opposite direction, because it is difficult to keep the device horizontal. While page turning cannot be performed if the half of the screen is touched with a finger and the page turning is performed in a direction corresponding to the touched half portion, page turning continues in the opposite direction.

Although not shown, pages 103, 104, . . . , each of which is the next page, are sequentially displayed by tilting the device in the opposite direction in FIG. 7A, i.e., by tilting the device so that the roll angle is negative.

While the two-page spread is displayed as a page layout in FIGS. 7A-7D for explanation, only one page may be displayed.

Figure 8:
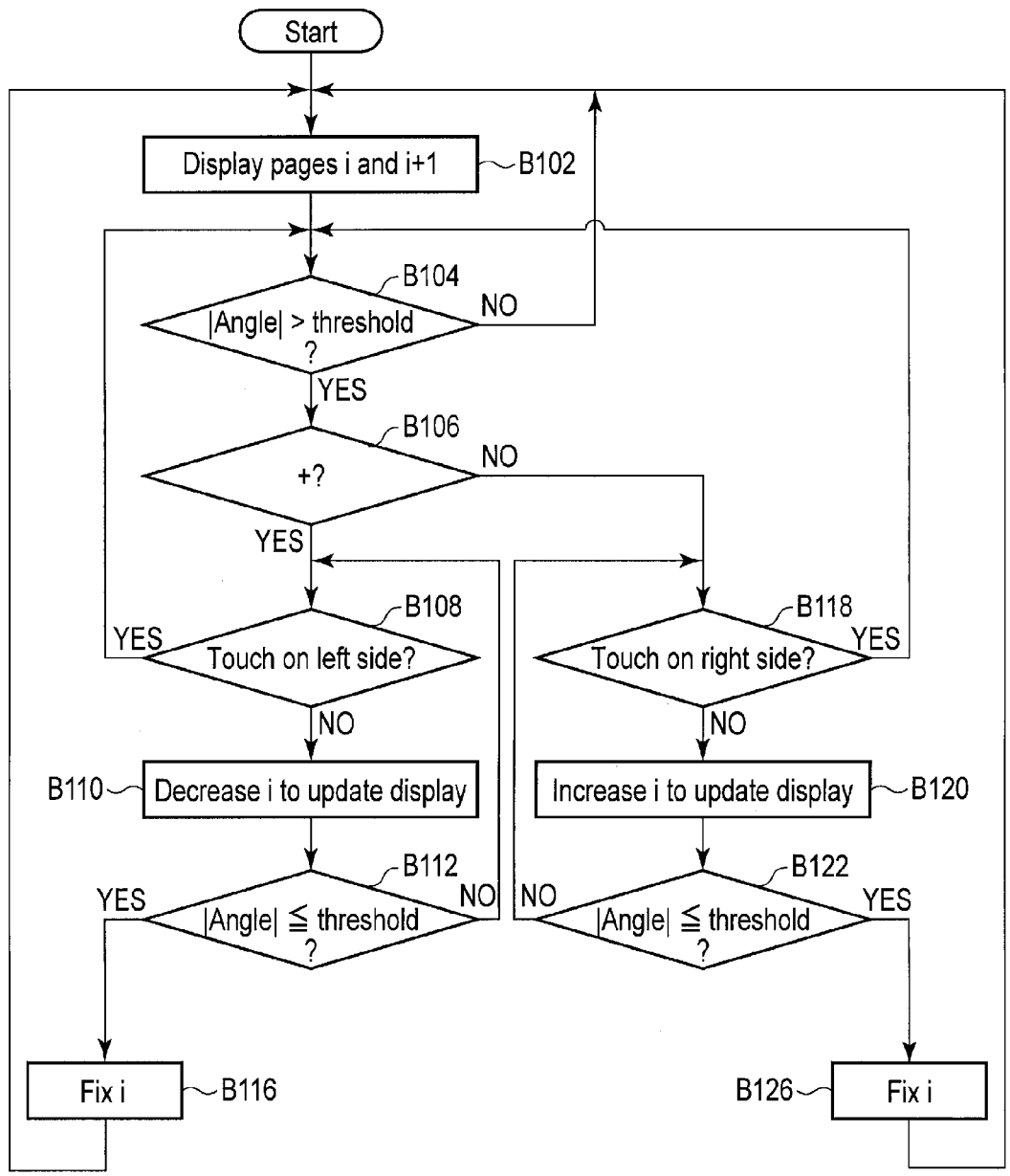
FIG. 8 is an exemplary flowchart illustrating page-turning processing of the electronic book reader of the embodiment.

FIG. 8 is an exemplary flowchart regarding the page turning described with reference to FIGS. 4A-4C, 5A-5D, 6A-6D, and 7A-7D.

In block B102, the two-page spread of pages i and i+1 is displayed. In block B104, it is determined whether an absolute value of the roll angle detected by the accelerometer 44 is larger than a threshold value. If the absolute value is larger than the threshold value, it can be determined that the electronic device rotates around the roll axis, i.e., the electronic device is tilted around the roll axis. If the absolute value is the threshold value or less, the processing returns to block B102.

As described above, if the device is tilted around the roll axis, page turning is performed so that the displayed page changes sequentially. Therefore, in order to prevent page turning from being performed carelessly, the angle of the threshold value (for example, 10 degrees) or less is regarded as horizontal.

If the absolute value is larger than the threshold value, it is determined in block B106 whether the roll angle is positive or not. If the roll angle is positive, it means that the electronic device is tilted so that the left side is frontward and the right side is the opposite side.

If the roll angle is positive, it is determined in block B108 whether the left half of the screen is touched with a finger. If the left half of the screen is not touched with a finger, page turning is performed from left to right as shown in FIGS. 4A, 4B, 6A and 6B. Therefore, as shown in block B110, the display is updated so that page number i decreases. If the left half of the screen is touched with a finger in block B108, page turning is not performed from left to right as shown in FIGS. 5B and 7B. The processing therefore returns to block B104.

After block B110, it is determined in block B112 whether an absolute value of the roll angle detected by the accelerometer 44 is the threshold or less. If the absolute value is the threshold or less, it can be determined that the electronic device has been returned to the horizontal. If the absolute value is the threshold value or less, page number i is fixed in block B116 and the processing returns to block B102 (see FIG. 4C).

If the absolute value is not the threshold value or less (i.e., larger than the threshold), the processing returns to block B102 (see FIG. 6C).

If the roll angle is negative, it is determined in block B118 whether the right half of the screen is touched with a finger. If the right half of the screen is not touched with a finger, page turning is performed from right to left. Therefore, as shown in block B120, the display is updated so that page number i increases. If the right half of the screen is touched with a finger, page turning is not performed from right to left. The processing therefore returns to block B104.

After block B120, it is determined in block B122 whether an absolute value of the roll angle detected by the accelerometer is the threshold or less. If the absolute value is the threshold or less, it can be determined that the electronic device has been returned to the horizontal. If the absolute value is the threshold value or less, page number i is fixed in block B126 and the processing returns to block B102.

If the absolute value is not the threshold value or less (i.e., larger than the threshold) in block B122, the processing returns to block B118.

If the electronic device is tilted so that the absolute value of the roll angle detected by the accelerometer 44 is larger than the threshold as shown in FIG. 8, page turning is performed in a direction depending on whether the roll angle is positive or negative so that the displayed page changes sequentially. Page turning continues until the electronic device is returned to the horizontal and the absolute value of the roll angle reaches the threshold or less.

In addition, page turning can be stopped in a direction according to the right or left half also by touching with a finger a certain point of the right or left half of the screen that display a page during page turning. Since page turning can be performed only by tilting the electronic device, the electronic device can be operated intuitively.

While it is assumed in the above description that a page continuously changes during tilting, if the user wants to turn only one page, the user can do so by tilting the device momentarily and then returning it to the horizontal immediately to execute block B110 or B112 only once.

Next, other examples of page turning will be described. In a printed book, by putting a finger on a "certain page" during page turning, the "certain page" can be opened immediately because the finger works as a bookmark, even if pages are overlapped thereon. The example of achieving this electronically will be described with reference to FIGS. 9A-9D and 10A-10B.

Figure 9A:
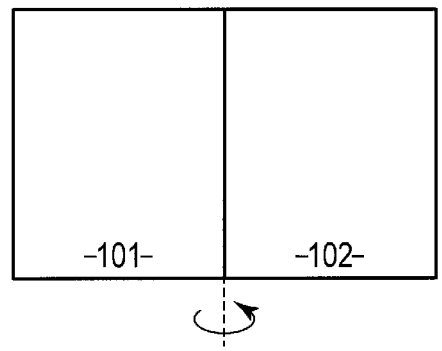
FIGS. 9A, 9B, 9C, and 9D are exemplary views illustrating yet another book display screen of the electronic book reader of the embodiment.
Figure 9B:
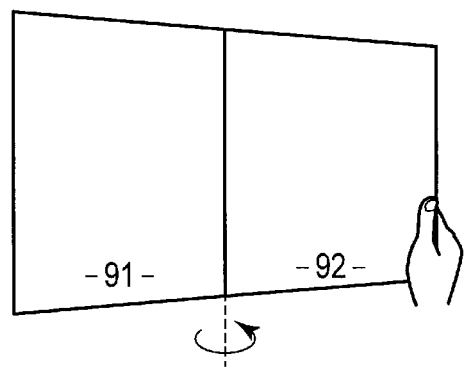

If the device is tilted so that the roll angle is positive with the two-page spread of pages 101 and 102 displayed as shown in FIG. 9A, the displayed page changes to decrease the page number and the two-page spread of pages 91 and 92 is displayed as shown in FIG. 9B. In this state, a certain point of the right half (page 92) of the display screen tilted on the opposite side is touched with a finger.

Figure 9C:
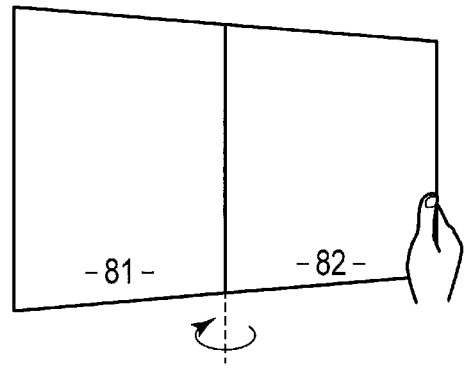
Figure 9D:
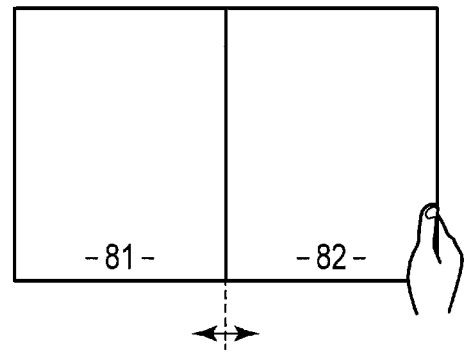

Further, in this state, if the device remains tilted, page turning is continued to display the two-page spread of pages 81 and 82 as shown in FIG. 9C. In this state, if the device is tilted in the opposite direction (so that the roll angle decreases) to be returned to the horizontal, the two-page spread of pages 81 and 82 is fixed as a displayed page as shown in FIG. 9D.

Figure 10A:
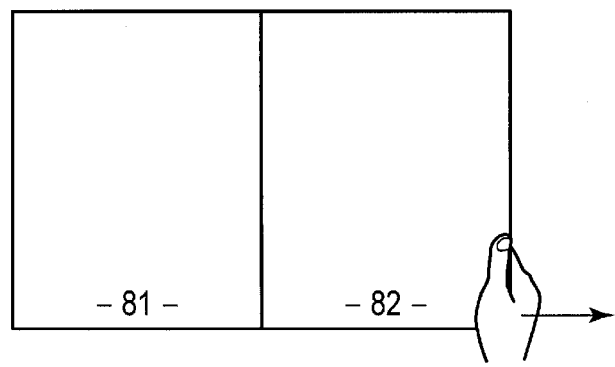
FIGS. 10A and 10B are exemplary views illustrating a further book display screen of the electronic book reader of the embodiment.

Thereafter, if the user releases his finger, the displayed page changes depending on how to release. As shown in FIG. 10A, if the user swipes or flicks rightward or simply releases, the displayed page remains as it is (i.e., pages 81 and 82).

Figure 10B:
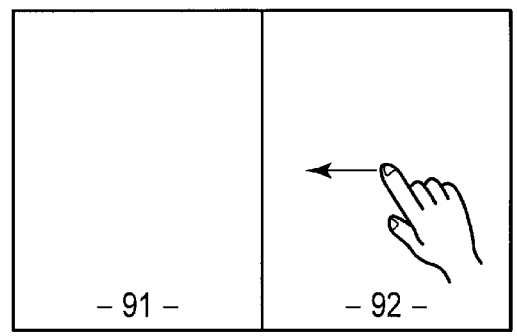

In contrast, as shown in FIG. 10B, if the user swipes or flicks his finger leftward on the right half of the screen, the displayed page returns to a displayed page (pages 91 and 92) at a time when a certain point of the right half of the display screen is touched by his finger. That is, when a desired page (pages 91 and 92) is displayed during page turning from left to right, the page is stored if a certain point of the right half of the screen is touched by his finger. Thereafter, if the electronic device is returned to the horizontal and the screen is swiped or flicked leftward, the displayed page returns to the stored page (pages 91 and 92).

Figure 11:
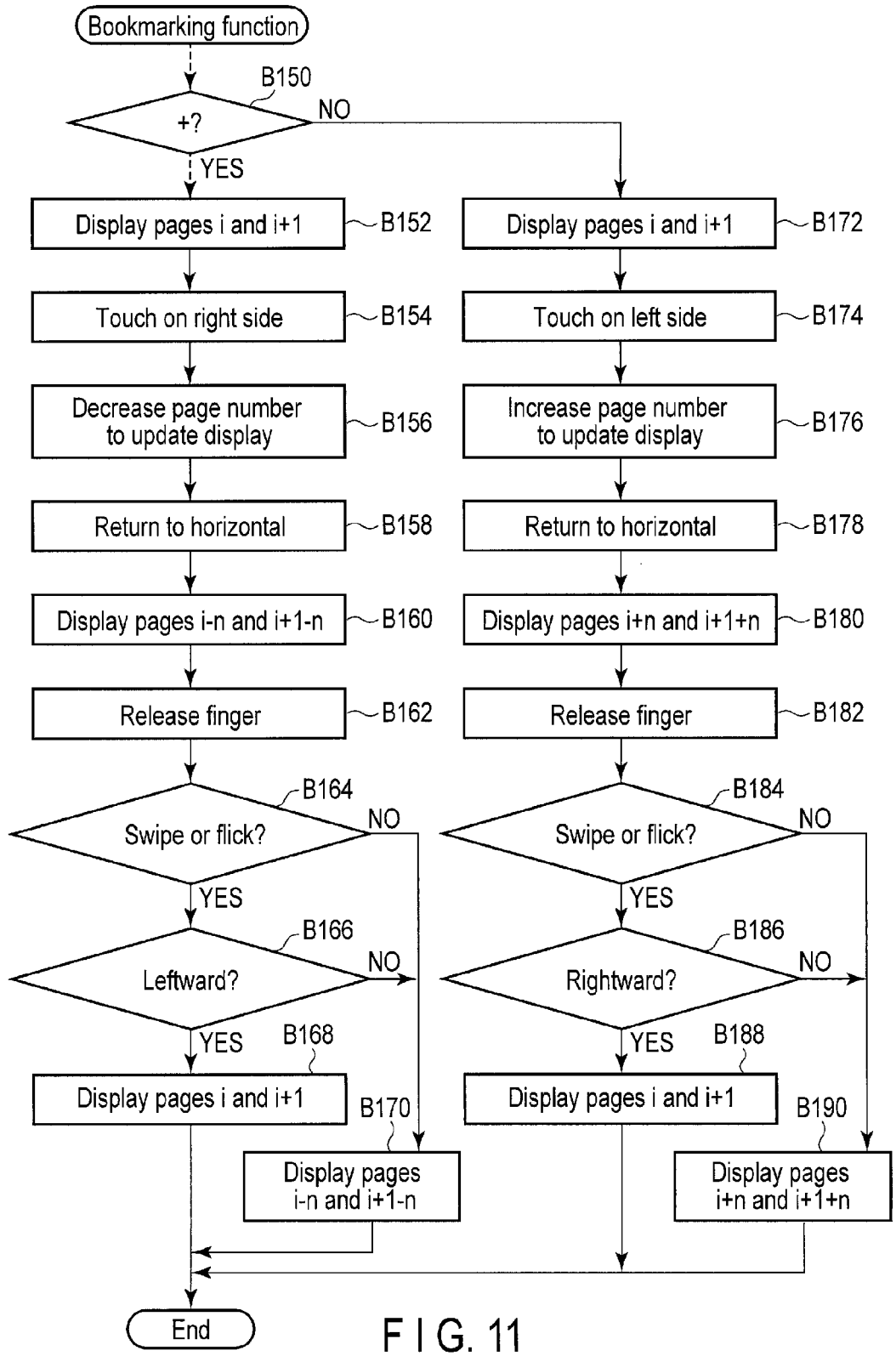
FIG. 11 is another exemplary flowchart illustrating page-turning processing of the electronic book reader of the embodiment.

FIG. 11 is a flowchart of such a bookmarking function.

As operation differs depending on the direction of tilting the electronic device, it is determined in block B150 whether the roll angle (which is assumed to be larger than the threshold) is positive. If the roll angle is positive, as shown in FIGS. 9A and 9B, the displayed page changes to decrease the page number and the two-page spread of pages i and i+1 is displayed in block B152.

In block B154, a certain point of the right half of the display screen is touched with a finger. In block B156, the displayed page changes to decrease the page number as the device remains tilted. In block B158, the device is tilted in the opposite direction (so that the roll angle decreases) to be returned to the horizontal and to fix the displayed page. In block B160, the two-page spread of pages i−n and i+1−n is displayed.

In block B162, a finger is released from the right half of the screen. In block B164, it is determined whether the finger is released by a swipe or flick. If it is simply a release, as shown in FIG. 10A, the display state remains unchanged to display the two-page spread of pages i−n and i+1−n in block B170. If it is a swipe or flick, its direction is determined in block B168.

If the direction is leftward, as shown in FIG. 10B, the display state returns to that of block B152 to display the two-page spread of pages i and i+1 in block B168. If the direction is rightward, as shown in FIG. 10A, the display state remains unchanged to display the two-page spread of pages i−n and i+1−n in block B170.

If it is determined in block B150 that the roll angle is not positive (i.e., the angle is negative), the displayed page changes to increase the page number and the two-page spread of pages i and i+1 is displayed in block B172. In block B174, a certain point of the left half of the display screen is touched with a finger. In block B176, the displayed page changes to increase the page number as the device remains tilted. In block B178, the device is tilted in the opposite direction (so that the roll angle increases) to be returned to the horizontal and to fix the displayed page. In block B180, the two-page spread of pages i+n and i+1+n is displayed.

In block B182, a finger is released from the left half of the screen. In block B184, it is determined whether the finger is released by a swipe or flick. If it is simply a release, the display state remains unchanged to display the two-page spread of pages i+n and i+1+n in block B190. If it is a swipe or flick, its direction is determined in block B186.

If the direction is rightward, the display state returns to that of block B172 to display the two-page spread of pages i and i+1 in block B188. If the direction is leftward, the display state remains unchanged to display the two-page spread of pages i+n and i+1+n in block B190.

Thus, if the electronic device is tilted so that an absolute value of the angle, for example, roll angle, detected by the accelerometer 44 is larger than the threshold, page turning is performed in a direction depending on whether the roll angle is positive or negative and the displayed page changes sequentially. Page turning continues until the electronic device is returned to the horizontal and the absolute value of the roll angle reaches the threshold or less. In addition, page turning can be performed by operating intuitively, since a page can be stored during page turning by touching with a finger a certain point of the right or left half of the screen that displays the page. As the page turning proceeds, it is possible to return to the display of a page touched by the finger with an easy operation. This allows the user to perform page turning in an electronic book with intuitive operations.

While it has been described in the above-mentioned embodiment that a finger does not touch the screen in the initial state and page turning is stopped by touching with the finger either or both the left/right half, either or both the left/right half of the screen may be touched by a finger in the initial state. In this case, it is assumed from the beginning that page turning cannot be performed in a predetermined direction. Also, the relationship between the direction of tilting and the forward/backward direction of page turning can be set by the user freely. The direction of tilting may not only be a roll direction but a pitch direction or a compass direction. Further, the display mode of a page is not limited to the examples shown; page turning may be performed page-by-page or page turning may not be displayed in simulation on the screen.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display configured to display a content including pages;
a touch panel on the display; and
circuitry configured to
detect a tilt of the device around an axis in an upper and lower direction of the touch panel,
switch a displayed page from a first page to a second page when the device is tilted in a first direction,
when a contact on a partial area of the touch panel corresponding to the first direction is detected, stop switching of a displayed page based on a tilt of the device in the first direction,
stop simulation display of page turning from left to right when the device is rotated around the axis such that a left side of the device is frontward and a right side is an opposite side and a contact on a region on a left side of the touch panel is detected,
stop simulation display of page turning from right to left when the device is rotated around the axis such that a right side of the device is frontward and a left side is an opposite side and a contact on a region on a right side of the touch panel is detected,
continue simulation display of page turning from left to right when the device is rotated around the axis such that a left side of the device is frontward and a right side is an opposite side and a contact on a region on a right side of the touch panel is detected, and
continue simulation display of page turning from right to left when the device is rotated around the axis such that a right side of the device is frontward and a left side is an opposite side and a contact on a region on a left side of the touch panel is detected.

2. The device of claim 1, wherein the circuitry is configured to switch a displayed page at a speed according to an angle of rotation around the axis.

3. The device of claim 2, wherein the circuitry is configured to
switch a displayed page so as to simulate page turning from left to right according to a rotation around the axis such that a left side of the device is frontward and a right side is an opposite side, and
switch a displayed page so as to simulate page turning from right to left according to a rotation around the axis such that a right side of the device is frontward and a left side is an opposite side.

4. The device of claim 1, wherein the circuitry is configured to
stop simulation display of page turning when the device is returned to a horizontal; and
display a page displayed at a time when a first operation on the touch panel is detected, after stopping the simulation display of page turning.

5. The device of claim 4, wherein the first operation comprises a flick operation or a swipe operation.

6. The device of claim 1, wherein the circuitry is configured to prevent a displayed page from being turned when the device is tilted and contacts on two points of both sides of the touch panel are detected.

7. A method for an electronic device comprising a display configured to display a content including pages and a touch panel on the display, the method comprising:
detecting a tilt of the device around an axis in an upper and lower direction of the touch panel;
switching a displayed page from a first page to a second page when the device is tilted in a first direction;
when a contact on a partial area of the touch panel corresponding to the first direction is detected, stopping switching of a displayed page based on a tilt of the device in the first direction,
stopping simulation display of page turning from left to right when the device is rotated around the axis such that a left side of the device is frontward and a right side is an opposite side and a contact on a region on a left side of the touch panel is detected,
stopping simulation display of page turning from right to left when the device is rotated around the axis such that a right side of the device is frontward and a left side is an opposite side and a contact on a region on a right side of the touch panel is detected,
continuing simulation display of page turning from left to right when the device is rotated around the axis such that a left side of the device is frontward and a right side is an opposite side and a contact on a region on a right side of the touch panel is detected, and
continuing simulation display of page turning from right to left when the device is rotated around the axis such that a right side of the device is frontward and a left side is an opposite side and a contact on a region on a left side of the touch panel is detected.

8. The method of claim 7, further comprising switching a displayed page at a speed according to an angle of rotation around the axis.

9. A non-transitory computer-readable storage medium having stored thereon a computer program which is executable by a computer comprising a display configured to display a content including pages and a touch panel on the display, the computer program comprising instructions capable of causing the computer to execute functions of:
detecting a tilt of the device around an axis in an upper and lower direction of the touch panel;
switching a displayed page from a first page to a second page when the device is tilted in a first direction;
when a contact on a partial area of the touch panel corresponding to the first direction is detected, stopping switching of a displayed page based on a tilt of the device in the first direction,
stopping simulation display of page turning from left to right when the device is rotated around the axis such that a left side of the device is frontward and a right side is an opposite side and a contact on a region on a left side of the touch panel is detected,
stopping simulation display of page turning from right to left when the device is rotated around the axis such that a right side of the device is frontward and a left side is an opposite side and a contact on a region on a right side of the touch panel is detected,
continuing simulation display of page turning from left to right when the device is rotated around the axis such that a left side of the device is frontward and a right side is an opposite side and a contact on a region on a right side of the touch panel is detected, and
continuing simulation display of page turning from right to left when the device is rotated around the axis such that a right side of the device is frontward and a left side is an opposite side and a contact on a region on a left side of the touch panel is detected.

10. The storage medium of claim 9, further comprising switching a displayed page at a speed according to an angle of rotation around the axis.

* * * * *